United States Patent [19]

Kountz et al.

[11] 4,351,160

[45] Sep. 28, 1982

[54] CAPACITY CONTROL SYSTEMS FOR SCREW COMPRESSOR BASED WATER CHILLERS

[75] Inventors: Kenneth J. Kountz, Palatine, Ill.; Richard A. Erth, York, Pa.

[73] Assignee: Borg-Warner Corporation, Chicago, Ill.

[21] Appl. No.: 159,572

[22] Filed: Jun. 16, 1980

[51] Int. Cl.³ .............................................. F25D 17/02
[52] U.S. Cl. ....................................... 62/201; 62/203; 62/228; 62/209
[58] Field of Search ................. 62/226, 228, 229, 201, 62/215, 208, 209, 211, 203

[56] References Cited

U.S. PATENT DOCUMENTS

| | | | |
|---|---|---|---|
| Re. 29,283 | 6/1977 | Shaw | 417/282 |
| 3,355,906 | 12/1967 | Newton | 62/228 X |
| 3,924,972 | 12/1975 | Szymaszek | 417/310 |
| 4,058,988 | 11/1977 | Shaw | 62/160 |
| 4,147,475 | 4/1979 | Shoop et al. | 417/310 |
| 4,151,725 | 5/1979 | Kountz et al. | 62/228 C |
| 4,259,845 | 4/1981 | Norbeck | 62/228 X |

*Primary Examiner*—Albert J. Makay
*Assistant Examiner*—Harry Tanner
*Attorney, Agent, or Firm*—James E. Tracy

[57] ABSTRACT

A control system for a rotary helical screw compressor of the variable speed type includes a variable speed motor driving the compressor for varying the compressor capacity and a slide valve member which is adjusted optimally for varying the volume of gas trapped in the working chamber prior to discharge as a function of the pressure ratio across the compressor. There is also provided a control system for a rotary helical screw compressor of the fixed speed type which include a first slide valve member for varying the compressor capacity through modulating the volume of gas trapped in the working chamber prior to compression and a second slide valve member for adjusting optimally the volume of gas trapped in the working chamber prior to discharge as a function of the pressure ratio across the compressor.

7 Claims, 6 Drawing Figures

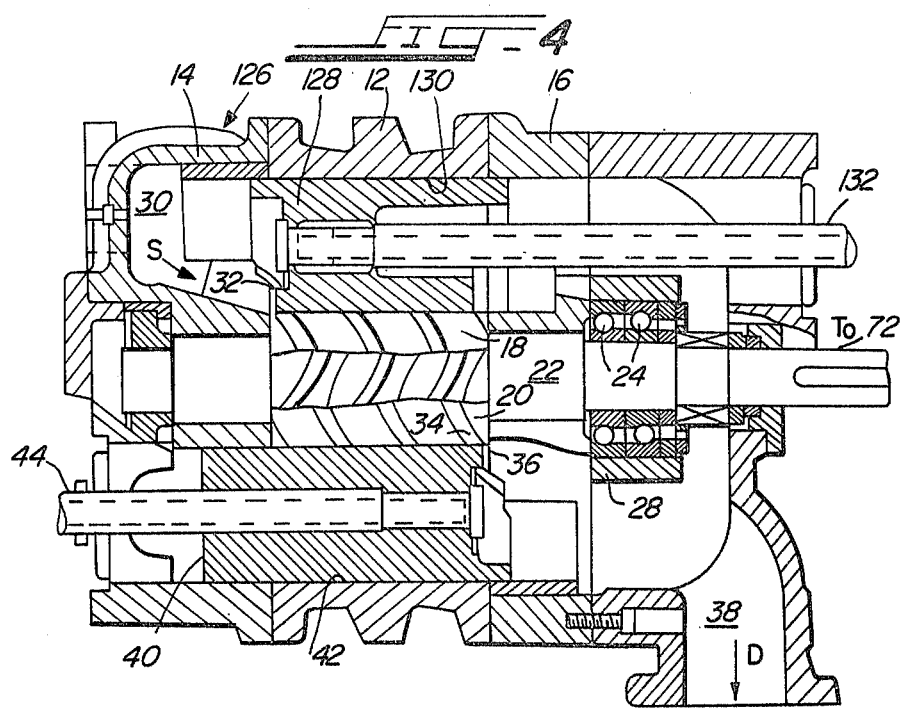
FIG-4
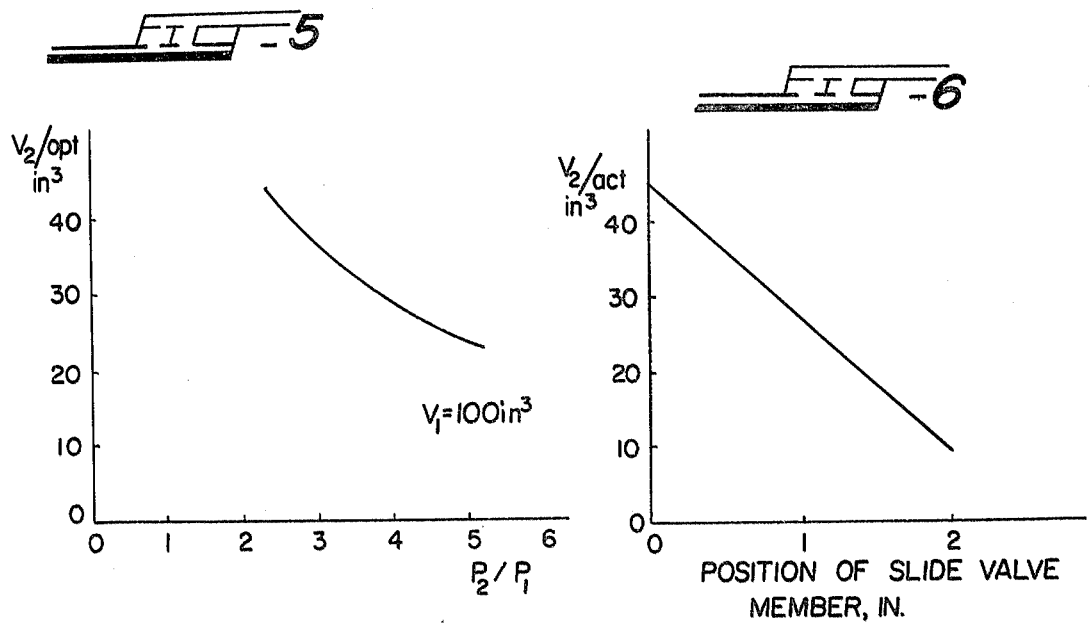
FIG-5
FIG-6

CAPACITY CONTROL SYSTEMS FOR SCREW COMPRESSOR BASED WATER CHILLERS

BACKGROUND OF THE INVENTION

1. Field of the Invention

This invention relates generally to rotary helical screw compressors and more particularly, it relates to capacity control systems for variable and fixed speed helical screw compressors utilized in refrigeration apparatus.

2. Description of the Prior Art

In U.S. Pat. No. 3,924,972 issued to P. G. Szymaszek on Dec. 9, 1975, there is described a control means for a variable capacity rotary screw compressor which includes an automatic control unit to position a slide valve to control compressor capacity as a function of some system condition being monitored.

In U.S. Pat. No. Re. 29,283 issued to D. N. Shaw on June 28, 1977, there is described a rotary, helical screw compressor having an axially shiftable slide valve member in response to the differential pressure between the trapped volume in the compression chamber and the discharge port line pressure.

In U.S. Pat. No. 4,058,988 issued to D. N. Shaw on Nov. 22, 1977, there is described a helical screw rotary compressor having oppositely oriented slide valves at the suction and discharge sides of the machine to control compressor capacity and balance the closed thread pressure at discharge with discharge line pressure in a main closed loop heat pump refrigeration system.

In U.S. Pat. No. 4,147,475 issued to J. C. Shoop et al. on Apr. 3, 1979, there is shown a helical screw air compressor unit having a rotary capacity control valve, a compressor inlet throttling valve, and a pressure relief valve for venting the compressor discharge conduit.

In U.S. Pat. No. 4,151,725 issued to K. J. Kountz et al. on May 1, 1979, there is shown a control system for regulating a centrifugal compressor through the combination of adjustable inlet guide vanes and a variable speed motor for varying the compressor capacity.

As is generally known, a rotary helical screw compressor includes a fixed compressor housing which has a low pressure port at one end and a high pressure port at the other end. The housing has a working chamber in terms of closed threads formed by a pair of parallel intersecting bores in which are rotatably mounted two intermeshing screw rotors. The screw compressor operates as a positive displacement machine for compressing air or gas such as a refrigerant between the suction or low pressure side and the discharge or high pressure side of the screw compressor.

Due to the importance of energy conservation in recent years, there has been needed a way to operate such screw compressors in a more efficient and reliable manner so as to improve efficiency and thus achieving energy cost-savings. It has been discovered that a rotary helical screw compressor of the variable speed type can be operated with improved efficiency not only by varying the compressor capacity through modulating the speed of a variable speed motor driving the compressor, but by adjusting optimally also the volume of gas trapped in the working chamber prior to discharge as a function of the pressure ratio across the compressor. In a rotary helical screw compressor of the fixed speed type, improved efficiency is achieved by varying the compressor capacity through modulating the volume of gas trapped in the working chamber prior to compression and by adjusting optimally the volume of gas trapped in the working chamber prior to discharge as with the variable speed type.

SUMMARY OF THE INVENTION

Accordingly, it is a general object of the present invention to provide new and improved capacity control systems for screw compressor based water chillers.

It is another object of the present invention to provide a capacity control system for a rotary helical screw compressor of the variable speed type employed in a refrigeration apparatus in which the capacity is modulated by changing the speed of a variable speed motor driving the compressor while the volume of gas trapped in the working chamber prior to discharge is adjusted optimally as a function of the pressure ratio across the compressor.

It is another object of the present invention to provide a capacity control system for a rotary helical screw compressor of the fixed speed type employed in a refrigeration apparatus in which the capacity is modulated by varying the volume of gas trapped in the working chamber prior to compression while adjusting optimarlly the volume of gas trapped in the working chamber prior to discharge as a function of the pressure ratio across the compressor.

In accordance with these aims and objectives, there is provided in the present invention a capacity control system for a rotary helical screw compressor of the variable speed type employed in a refrigeration system having a compressor, a condenser, an expansion device, and an evaporator, all connected in a closed refrigeration circuit. An electric motor is responsive to a control speed signal for varying the speed of the electric motor for regulating the capacity of the screw compressor. A first temperature sensing means is positioned adjacent the chilled water discharge of the evaporator to provide a first signal. An adjustable mean is provided in the control system for establishing a temperature set point signal. A first circuit is provided for combining the chilled water temperature signal and the temperature set point signal to produce the speed control signal which is applied to the electric motor. A second circuit includes a second temperature sensing means positioned in the two-phase refrigerant condensing fluid to provide a second signal representative of the temperature of the refrigerant vapor, which is directly proportional to the discharge pressure of the screw compressor, and a third temperature sensing means positioned inside the evaporator to provide a third signal representative of the temperature of the boiling two-phase refrigerant, which is directly proportional to the suction pressure. A divisional and functional dependent means is connected to receive both the second and third signals and to provide an optimal volume signal. A third circuit responsive to the optimal volume signal and an electrical signal representative of the actual physical position of a slide valve member generates an error signal for regulating the position of the slide valve member as a function of the pressure ratio across the screw compressor.

The present invention also includes a second capacity control system for a screw compressor of the fixed speed type employed in a refrigeration apparatus having a compressor, a condenser, an expansion device, and an evaporator, all connected in a closed refrigeration circuit. The screw compressor includes a first slide valve member for regulating the capacity of the screw compressor and a second slide valve member for adjusting the actual volume of gas trapped in the compression chamber prior to discharge as a function of the compressor ratio across the screw compressor. A first circuit is provided to generate a control signal for regulating the position of the first slide valve member. Except for this difference, the first circuit is identical in operation as the first circuit of the variable speed type screw compressor. Second and third circuits are provided, identical as to the variable speed screw compressor, for regulating the position of the second slide valve member for adjusting the actual volume of gas trapped in the compression chamber prior to discharge as a function of the pressure ratio across the screw compressor.

BRIEF DESCRIPTION OF THE DRAWINGS

These and other objects of the present invention will become more fully apparent from the following detailed description when read in conjunction with the accompanying drawings wherein:

FIG. 4 is a longitudinal view of a rotary helical screw compressor of a type which may be used suitably with the capacity control system shown in FIG. 2;

FIG. 5 is a graph showing the optimal volume of gas trapped in the compression chamber prior to discharge as a function of the pressure ratio across the compressor; and FIG. 6 is a graph showing the actual volume of trapped gas in the compression chamber prior to discharge as a function of the position of the slide valve member.

DETAILED DESCRIPTION OF THE PREFERRED EMBODIMENT

Figure 1:
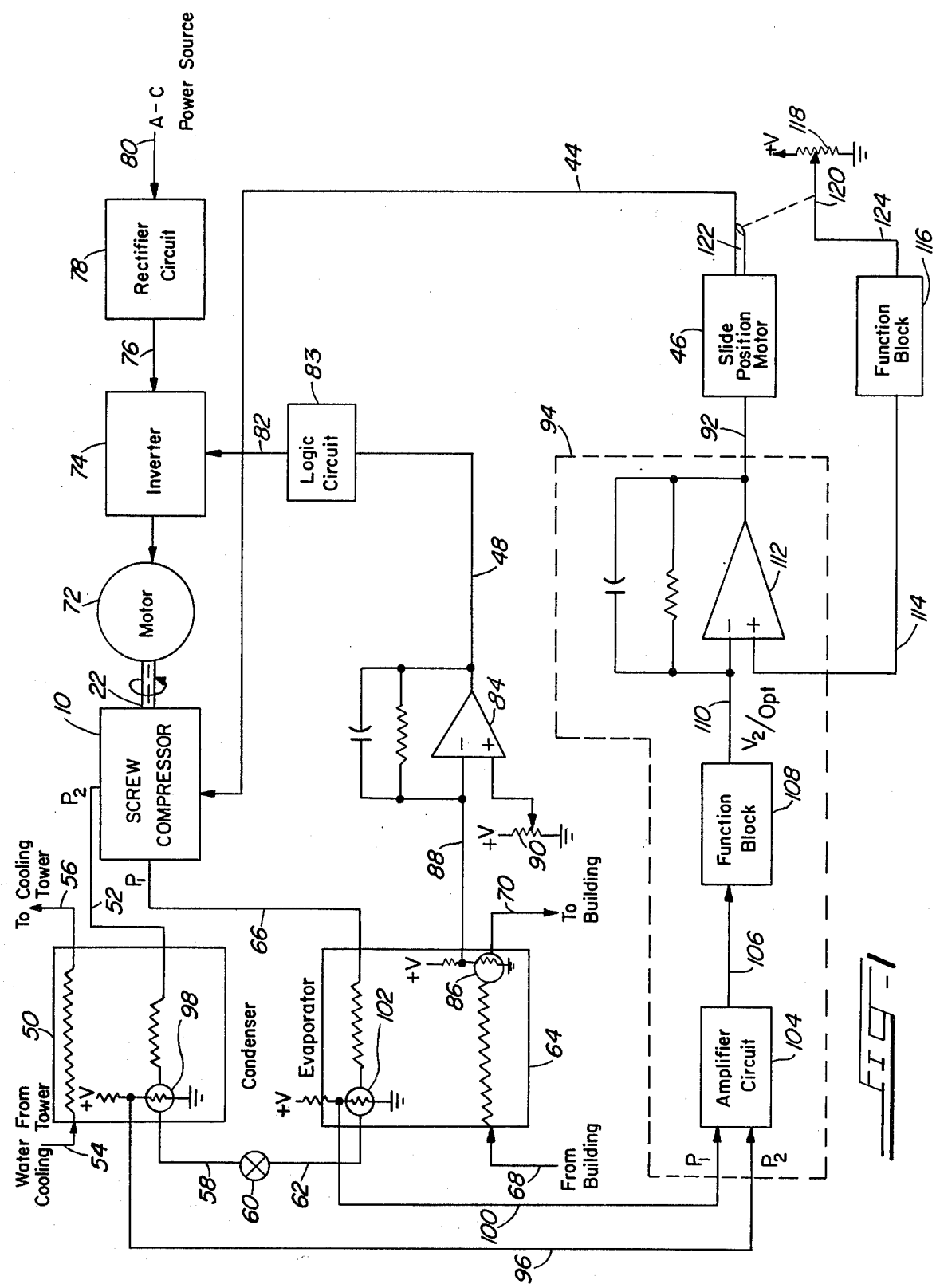
FIG. 1 is a schematic diagram of a capacity control system for a rotary helical screw compressor of the variable speed type employed in a refrigeration apparatus of the present invention.
Figure 3:
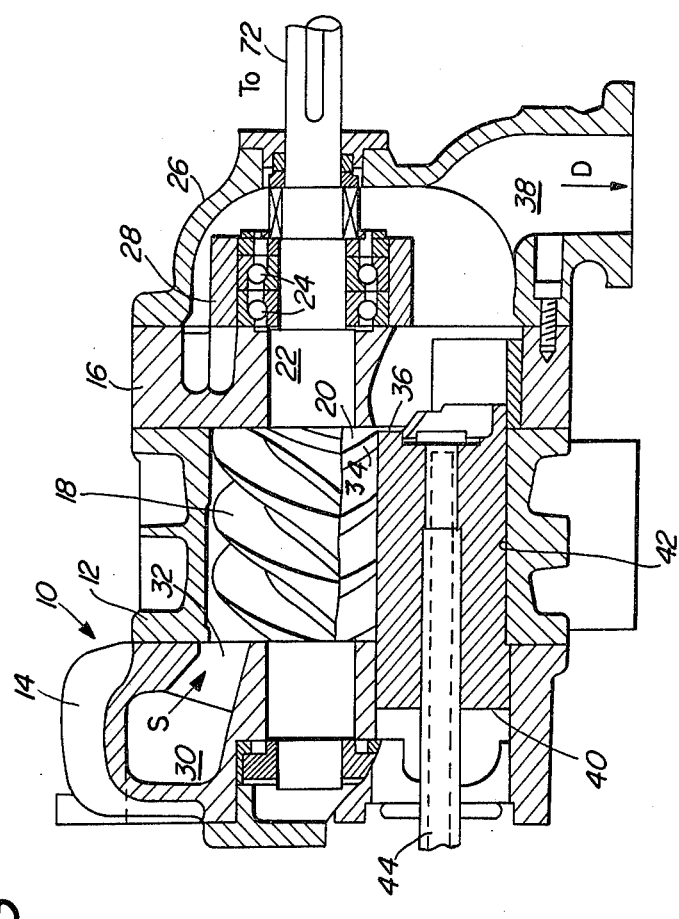
FIG. 3 is a longitudinal section view of a rotary helical screw compressor of a type which may be used suitably with the capacity control system shown in FIG. 1.

Referring now with particularity to the drawings, there is illustrated in FIG. 1 a schematic diagram of a capacity control system for a rotary helical screw compressor of the variable speed type which is employed in a conventional refrigeration circuit. The control system includes a rotary helical screw compressor generally designated by reference numeral 10. Referring to FIG. 3, the compressor 10 comprises a housing structure having a central barrel portion 12 located between end wall sections 14 and 16. The central barrel portion 12 is formed by two intersecting parallel bores in which are rotatably disposed a pair of intermeshing helical rotors 18 and 20. In a known way, both the male and female rotors have helical lands and intervening grooves and are mounted rotatably in the bores by means of bearings. The male rotor 18 is coupled to one end of a shaft 22 which is supported for rotation by antifriction bearings 24. The bearings 24 are disposed on the end wall section 16 and are also mounted within an end bell 26 via a sleeve 28. The other end of the shaft 22 extends through the end bell 26 and is adapted to be driven by an electrical motor as the prime mover force for driving the screw compressor 10.

As the screw compressor is rotated in a single direction, working fluid such as gaseous refrigerant is passed through the suction or intake passage 30 within the end wall portion 14 and is delivered via inlet port 32 into a series of working chambers 34 formed by the intermeshed helical lands and grooves of the respective rotors 18 and 20. A high pressure discharge port 36 is in fluid communication with the working chambers, which define compression chambers or closed threads and with a discharged passage 38 formed within the end bell 26. A slide valve member 40 is provided for adjusting the volume of trapped gas in the working chambers prior to discharge as a function of the pressure ratio across the compressor. The valve member 40 is longitudinally slidable within an axially extending recess 42 for varying the amount of trapped gas in the working chamber 34 prior to discharge. The valve member is connected to one end of a rod 44, and the other end of the rod is mechanically coupled to a slide positioning motor 46 (FIG. 1) which moves the valve member 40 between extreme left and right hand positions. By movement of the valve to the left position in which the discharge port 36 is fully opened, the compression time is shortened and the pressure ratio between the suction and discharge sides of the compressor is decreased. On the other hand, when the valve member 40 is moved to the right position closing the discharge port 36 the compression time is lengthened and the pressure ratio is increased. Therefore, for any given or desired compression ratio of the compressor the slide valve member 40 can be varied to effect this result by adjusting the volume of gas trapped in the working chamber 34 at the point of discharge.

In accordance with the present invention, the capacity control system shown in FIG. 1 is utilized to regulate automatically the position of the slide valve member 40 as a function of the pressure ratio across the screw compressor 10 while the capacity of the compressor is controlled by a speed control signal supplied over line 48. The control system includes certain conventional components of a refrigeration circuit such as a condenser 50 which receives compressed refrigerant vapor through line 52 from the discharge passage 38 of the screw compressor 10. Water from a cooling tower (not shown) is delivered via line 54 into the condenser and is returned over line 56 to the cooling tower. Condensed liquid refrigerant from the condenser 50 is passed over line 58 through an expansion device 60 and line 62 to an evaporator 64. The refrigerant vapor from the evaporator 64 is delivered back to the intake passage 30 of the screw compressor via line 66. The higher temperature water from the building (not shown) or other cooling load is fed by line 68 for heat exchange with the liquid refrigerant in the evaporator 64 and is then returned as chilled water to the building via line 70.

An electrical prime mover such as an induction motor 72 is coupled over the shaft 22 to the screw compressor 10. The motor is driven from an inverter 74 which receives a d-c input voltage over line 76 for determining the amplitude of the inverter output voltage. A rectifier circuit 78 is provided between an A-C power source line 80 and the line 76 which delivers the d-c voltage to the inverter 74. The frequency of the inverter output voltage is regulated by the periodicity of gating or triggering pulse signals supplied over line 82 from a logic circuit 83. This logic circuit is a conventional one which receives the speed control signal on line 48 and utilizes such control signal to regulate the frequency of the pulses supplied on the line 82. As is generally known, the speed of the induction motor 72 is directly proportional to the frequency of the inverter output voltage.

The speed control signal is a d-c voltage supplied at the output of an operational amplifier 84 connected as an integrating circuit. A first temperature sensing means such as a thermistor 86 is positioned to sense the temperature of the chilled water discharged from the evaporator 64. The chilled water temperature signal is passed via line 88 to the inverting input of the amplifier 84. A temperature set point signal from potentiometer 90 defining adjustment means establishes the desired temperature control level and is sent to the non-inverting input of the amplifier 84. A temperature error signal is produced at the output of the amplifier 84, which is the speed control signal, for regulating the operating frequency of the inverter 74 via the logic circuit 84 and thus the speeds of the motor 72 and screw compressor 10 to effect the desired capacity.

The position of the slide valve member 40 is controlled by an output positioning signal on line 92 of a valve control circuit 94. The valve control circuit receives a first input signal on line 96 from a second sensing means such as thermistor 98 positioned to sense the temperature of the two-phase condensing refrigerant in the condenser 50. This first input signal is directly proportional to the pressure $P_2$ at the discharge passage 38 of the screw compressor 10. A second input signal is provided on line 100 to the control circuit, which is obtained from a third sensing means such as thermistor 102 positioned to sense the temperature of the two-phase boiling refrigerant in the evaporator 64. The second input signal is directly proportional to the pressure $P_1$ at the suction passage 30 of the screw compressor.

The valve control circuit 94 includes an amplifier circuit means 104 which combines the first and second input signals to provide a resulting signal on line 106 which corresponds to a pressure ratio $(P_2P_1)$ across the screw compressor. As is apparent to those skilled in the art, the amplifier circuit means 104 is formed as a divisional circuit to provide a ratio resultant signal. The resultant signal on the line 106 is connected to the input of an electronically-stored function block 108 which determines the optimal volume $V_2$/opt of trapped gas in the compression chamber 34 prior to discharge as a function of the resultant signal. In FIG. 5 of the drawings, there is shown a graph of the function block 108 with the optimal volume $V_2$/opt as a function of the ratio $P_2/P_1$ resultant signal. This graph can be determined either theoretically as for compression along an isentropic line or empirically derived. The output of the function block 108 on line 110 is representative of the optimal volume $V_2$opt and is fed to the inverting input of an operational amplifier 112.

The control circuit 94 receives a third input signal which is applied to the non-inverting input of the operational amplifier 112. This third signal is an output signal on line 114 from another electronically-stored function block 116. This output signal corresponds to the actual volume $V_2$/act of trapped gas in the compression chamber prior to discharge as computed from the functional block 116. In FIG. 6 of the drawings, there is shown a graph of the function block 116 relating the actual volume $V_2$/act as a function of the actual physical position of the slide valve member 40. The operational amplifier 112 compares the optimal volume $V_2$/opt with the actual volume $V_2$/act and then integrates the same to produce an error signal, which is the output positioning signal on the line 92, for operating the slide position motor 46 so as to off-set any error in the position of the slide valve member. It should be clearly understood that the function blocks 108 and 116 can be implemented by standard electronic circuits, such as with logarithmic amplifiers.

A potentiometer 118 is provided with a movable arm or wiper 120 mechanically coupled to the output shaft 122 of the position motor 46 which drives the rod 44 to move the valve member 40. The electrical signal on the line 124 is representative of the actual physical position of the slide valve member 40 in a continuous manner. Accordingly, it can be seen that this electrical signal via the function block 116 is combined with the signal corresponding to the optimal volume $V_2$/opt by the amplifier 112 to effect the actual volume of the gas trapped in the compression chamber.

Figure 2:
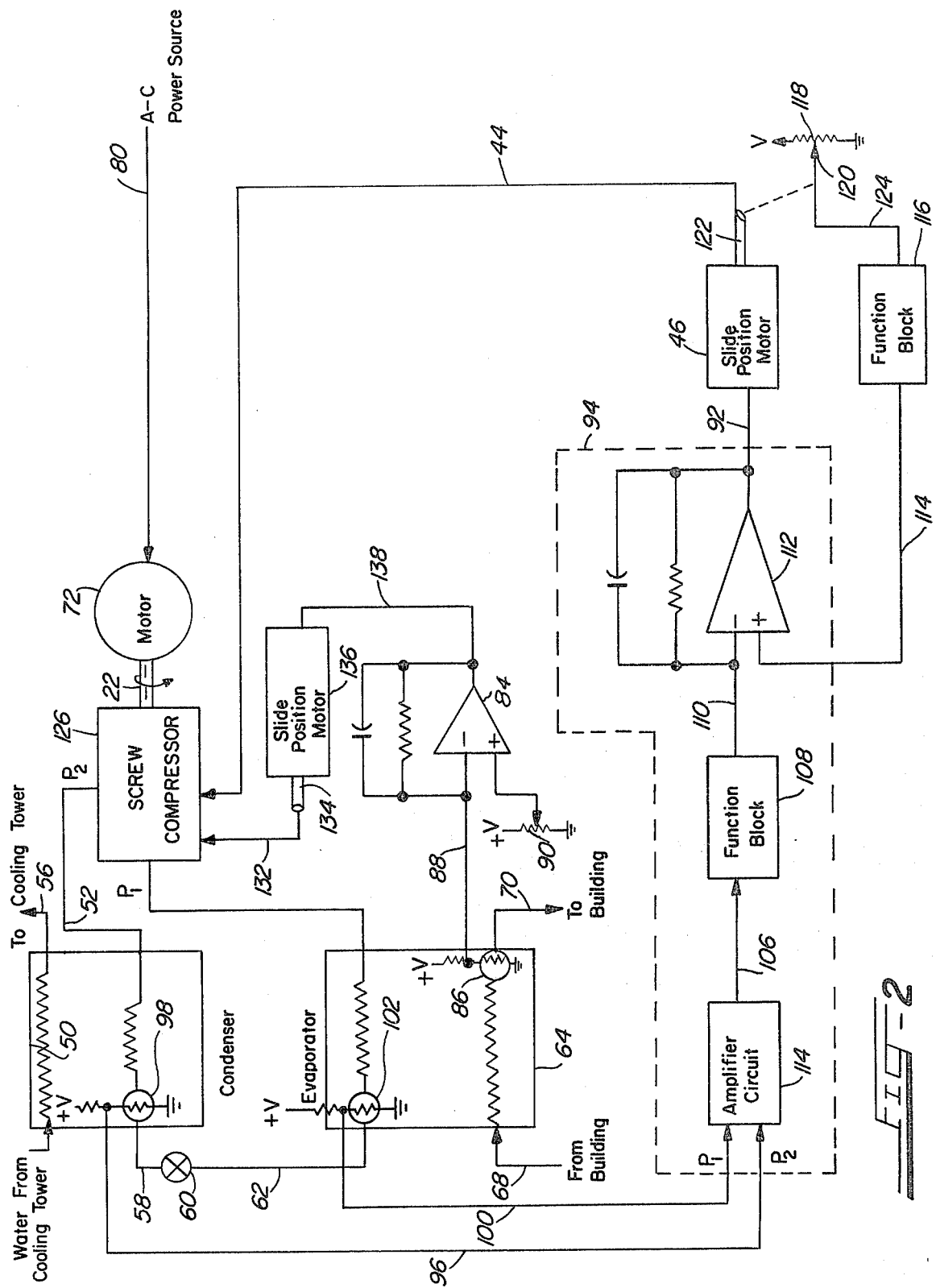
FIG. 2 is a schematic diagram of a capacity control system for a rotary helical screw compressor of the fixed speed type employed in a refrigeration apparatus of the present invention.

FIG. 2 depicts a schematic diagram of a capacity control system for a rotary helical screw compressor of the fixed speed type which is employed in a conventional refrigeration apparatus. The control system includes a rotary helical screw compressor generally designated by reference numeral 126, which is shown in detail in FIG. 4. Like reference numerals have been employed in FIGS. 2 and 4 which correspond to the like elements of FIGS. 1 and 3. Since the operation and construction of the slide valve member 40 for regulating the volume of gas trapped in the compression chamber prior to discharge is identical in all aspects to that described earlier in conjunction with FIG. 1 and 3, reference may be had to such description for the details.

Unlike the screw compressor 10 of FIG. 1, the screw compressor 126 includes also a second slide valve member 128 disposed to the side of the intermeshed rotors, opposite that of the slide valve member 40, and is longitudinally slidable within a second axially extending recess 130. The second valve member is connected to one end of a rod 132, and the other end of the rod is mechanically connected to the shaft 134 of a second slide position motor 136 which moves the valve member 128 between extreme left and right positions for regulating the capacity of the screw compressor. The screw compressor is designed so that movement of the valve member 128 to the left decreases the capacity. Conversely, movement of the valve member 128 to the right increases the capacity of the screw compressor since more and more of the working space defined by the intermeshed rotors and the bores carrying the same is exposed to the inlet port 32.

The control system shown in FIG. 2 is utilized to regulate automatically the position of the slide member 40 as a function of the pressure ratio across the screw compressor while the capacity of the compressor is controlled by a control signal supplied over line 138 for regulating automatically the position of the slide member 128. As can be seen, the control system of FIG. 2 does not include the logic circuit 83 and the inverter 74 of FIG. 1 since the compressor is operated at a fixed speed. Thus, the A-C power source is applied directly to the motor 72 via the line 80.

From the foregoing detailed description, it can thus be seen that the present invention provides a new and improved capacity control system for a rotary helical screw compressor of the variable speed type which is employed in a refrigeration apparatus in which the position of a slide valve member is regulated automatically as a function of the pressure ratio across the compressor while the capacity of the compressor is controlled by a speed control signal applied to the induction motor driving the compressor. Further, the present invention provides a capacity control system for a rotary helical screw compressor of the fixed speed type which is employed in a refrigeration apparatus in which the position of a first slide valve member is regulated automatically to control the capacity of the compressor while the position of a second slide valve member is regulated automatically as a function of the pressure ratio across the compressor.

While there has been illustrated and described what is at present to be preferred embodiments of the present invention, it will be understood by those skilled in the art that various changes and modifications may be made and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out this invention but that the invention will include all embodiments falling within the scope of the appended claims.

What is claimed is:

1. A control system for a helical rotary screw compressor employed in a refrigeration apparatus having a condenser, an expansion device and an evaporator connected in a closed refrigeration circuit with the screw compressor, the refrigeration apparatus also including capacity varying means for varying the capacity of the screw compressor, comprising in combination:

said screw compressor compressing gas from a low pressure at suction to a high pressure at discharge and including a housing with a barrel portion having a pair of parallel intersecting bores, an inlet port and a discharge port, two intermeshed helical rotors disposed in said bores and forming variable volume compression chambers, an axially extending recess disposed within said barrel portion in open communication with said bores, and a slide valve member being axially slidable in said recess between a first position in which the discharge port is fully opened and a second position in which the discharge port is closed;

first circuit means connected to provide a control signal to the capacity varying means for regulating the capacity of said screw compressor;

a slide positioning motor mechanically coupled to drive said slide valve member;

second circuit means connected to provide a signal representing the optimal volume of gas trapped in the compression chamber prior to discharge as a function of the pressure ratio across said screw compressor; and third circuit means, responsive to said second circuit means, connected to provide an error signal to said positioning motor for regulating the position of said slide valve member so as to adjust the actual volume of gas trapped in the compression chamber prior to discharge.

2. A control system as claimed in claim 1 wherein said first circuit means includes temperature sensing means positioned to provide a signal representative of the chilled water discharge temperature from the evaporator, adjustment means for establishing a temperature set point signal, and means for combining the chilled water temperature signal and the temperature set point signal to provide the control signal which is applied to the capacity varying means.

3. A control system as claimed in claim 1 wherein said second circuit means includes a first temperature sensing means positioned to provide a first signal representative of the temperature of the two-phase refrigerant condensing fluid in the condenser, which is directly proportional to the discharge pressure of said screw compressor, a second temperature sensing means positioned to provide a second signal representative of the temperature of the two-phase boiling refrigerant in the evaporator, which is directly proportional to the suction pressure of said screw compressor, and means responsive to said first and second signals to provide the optimal volume signal.

4. A control system as claimed in claim 1 further comprising means for generating an electrical signal representative of the actual physical position of said slide valve member.

5. A control system as claimed in claim 4 wherein said third circuit means includes means which responds to the optimal volume signal and the position-indicating signal to provide the error signal for regulating the actual physical position of said slide valve member.

6. A control system as claimed in claim 1 wherein said screw compressor is of the variable speed type and is driven by an electrical motor whose speed is varied in response to the control signal, produced by said first circuit means, to change the capacity of said screw compressor.

7. A control system as claimed in claim 1 wherein said screw compressor is of the fixed speed type and includes an additional axially extending recess disposed within said barrel portion in open communication with said bores and an additional slide valve member axially slidable in said additional recess between a first position in which the inlet port is fully opened and a second position in which the inlet port is closed, wherein an additional slide positioning motor is mechanically coupled to drive said additional slide valve member, and wherein the control signal, produced by said first circuit means, is applied to said additional slide positioning motor for varying the position of said additional slide valve member to regulate the capacity of said screw compressor.

* * * * *